2,927,112
3-AMINO-6-HALOPYRIDAZINES AND PROCESS OF PREPARATION

Edgar Alfred Steck, Metuchen, N.J., assignor to Sterling Drug Inc., New York, N.Y., a corporation of Delaware No Drawing. Application September 24, 1953
Serial No. 382,225

5 Claims. (Cl. 260—250)

This invention relates to a new process for the preparation of 3-aminopyridazine and to intermediates in said process, namely, 3-amino-6-halopyridazines wherein the halogen atom is chlorine or bromine.

3-aminopyridazine is useful as an intermediate in the preparation of 3-sulfanilamidopyridazine, a bactericidal agent of the sulfa drug type.

Syntheses of 3-aminopyridazine heretofore known are not satisfactory. Even based on the best yields, 3-aminopyridazine has been obtained in no more than 11% yield from either diethyl succinate or furoic acid as the starting materials. In contrast, by means of process of my invention the preparation of 3-aminopyridazine is realized in about 56% yield in three steps starting from maleic hydrazide.

Maleic hydrazide reacts with phosphorus oxychloride to give 3,6-dichloropyridazine in 82–87% yield. According to my invention, 3,6-dichloropyridazine when heated with a solution of ammonia in ethanol gives 3-amino-6-chloropyridazine. The reaction is carried out at a temperature between about 100° and 150° C. A preferred temperature is about 125–130° C. under which conditions a 70% yield of 3,6-dichloropyridazine is obtained. The last step comprises catalytic hydrogenolysis of 3-amino-6-chloropyridazine in which the chlorine atom is replaced by hydrogen, and 3-aminopyridazine is produced, which can be isolated as the hydrochloride in about 91.5% yield. The catalyst used in the hydrogenolysis is preferably a supported palladium catalyst such as palladium-on-charcoal.

Similarly, maleic hydrazide reacts with phosphorus oxybromide to give 3,6-dibromopyridazine. The latter when heated with ammonia in ethanol gives 3-amino-6-bromopyridazine which in turn can be debrominated under catalytic hydrogenation conditions to give 3-aminopyridazine.

The synthesis of 3-aminopyridazine from the readily available maleic hydrazide according to the process of my invention is outlined in the following flow sheet. In the formulas X stands for chlorine or bromine.

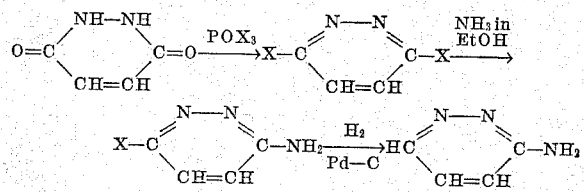

The following examples will further illustrate my invention.

EXAMPLE 1

(a) 3,6-dichloropyridazine

Maleic hydrazide was refluxed with an excess of phosphorus oxychloride, and the mixture was hydrolyzed in ice water after removal of most of the excess phosphorus oxychloride in vacuo. The aqueous mixture was rendered alkaline with concentrated ammonium hydroxide, and the resulting solid product was collected by filtration giving an 82–87% yield of 3,6-dichloropyridazine, which could be purified by distillation (B.P. 89–91° C. at 0.2 mm.), steam distillation, sublimation in vacuo, or recrystallization from hexane, giving a product melting at 69–70° C.

(b) 3-amino-6-chloropyridazine

A solution of 7.5 g. (0.05 mole) of 3,6-dichloropyridazine, prepared as described above in part (a), and 8.8 g. (0.52 mole) of ammonia in 100 cc. of absolute ethanol was heated at 125–130° C. for ten hours in a shaking autoclave. The reaction mixture was then concentrated in vacuo and the residue (8.7 g.) was extracted in a Soxhlet apparatus with ethyl acetate. Concentration of the ethyl acetate caused crystallization of 4.52 g. of 3-amino-6-chloropyridazine, M.P. 210–212° C. (dec.). A recrystallization from ethyl acetate produced colorless blades, M.P. 213–214° C. (dec.).

*Analysis.*—Calcd. for $C_4H_4ClN_3$: C, 37.08; H, 3.11; Cl, 27.37; N, 32.44. Found: C, 37.22, 37.44; H, 3.43, 3.28; Cl, 26.89; N, 32.54, 32.49.

3-amino-6-chloropyridazine forms acid-addition salts upon reaction with acids such as hydrochloric acid, hydrobromic acid, hydriodic acid, sulfuric acid, nitric acid, oxalic acid, citric acid, lactic acid and p-toluenesulfonic acid; there is produced respectively the hydrochloride, hydrobromide, hydriodide, sulfate or acid sulfate, nitrate, oxalate, citrate, lactate and p-toluenesulfonate of 3-amino-6-chloropyridazine.

(c) 3-aminopyridazine

A suspension of 5.18 g. (0.04 mole) of 3-amino-6-chloropyridazine, prepared as described above in part (b), 1.6 g. (0.04 mole) of sodium hydroxide and 0.1 g. of 7% palladium-on-charcoal catalyst in 150 cc. of absolute ethanol was subjected to hydrogenation at a pressure of three atmospheres. The reduction was slow, but an additional 0.5 g. of catalyst brought the reaction to completion. The reaction mixture was warmed, the catalyst was removed by filtration, and an excess of hydrochloric acid was added to the filtrate. The acidified filtrate was concentrated, and the residue (5.4 g.) was recrystallized twice from an absolute ethanol-pentane mixture, giving 4.8 g. of 3-aminopyridazine hydrochloride as colorless micro-crystals, M.P. 175.5–176.5° C.

*Analysis.*—Calcd. for $C_4H_5N_3 \cdot HCl$: N, 31.94; Cl, 26.95. Found: N, 31.70; Cl, 26.94.

3-aminopyridazine hydrochloride was converted to the free base by the addition of alkali, and the crude product was recrystallized from ethyl acetate, giving 3-aminopyridazine as transparent blades, M.P. 170–171° C.

EXAMPLE 2

(a) 3,6-dibromopyridazine

A mixture of 23.0 g. (0.2 mole) of maleic hydrazide and 400 cc. of molten phosphorus oxybromide was refluxed with stirring for two and one-half hours. The viscous reaction mixture was concentrated in vacuo and hydrolyzed with ice water. The aqueous mixture was made basic with ammonium hydroxide, and the resulting solid product (33.0 g.) was collected by filtration. The product was sublimed at 150° C. (0.5 mm.), recrystallized three times from methanol and then resublimed, giving 13.1 g. of 3,6-dibromopyridazine, colorless blades, M.P. 115–116° C.

(b) 3-amino-6-bromopyridazine was prepared from 11.9 g. of 3,6-dibromopyridazine, prepared as described above in part (a), and 28 g. of ammonia in 300 cc. of absolute ethanol at 140–145° C. according to the manipulative procedure described in Example 1, part (b). There was obtained 5.3 g. (96%) of 3-amino-6-bromopyridazine, M.P. 194–197° C., which after two recrystallizations from ethanol had the M.P. 201–203° C.

*Analysis.*—Calcd. for $C_4H_4BrN_3$: C, 27.60; H, 3.02; Br, 45.92; N (basic nitrogen), 8.05. Found: C, 27.98; H, 3.32; Br, 46.51; N (basic nitrogen), 8.07.

3-amino-6-bromopyridazine forms acid-addition salts upon reaction with acids such as hydrochloric acid, hydrobromic acid, hydriodic acid, sulfuric acid, nitric acid, oxalic acid, citric acid, lactic acid and p-toluenesulfonic acid; there is produced respectively the hydrochloride, hydrobromide, hydroiodide, sulfate or acid sulfate, nitrate, oxalate, citrate, lactate and p-toluenesulfonate of 3-amino-6-bromopyridazine.

3-amino-6-bromopyridazine when subjected to hydrogenation in the presence of palladium-on-charcoal catalyst according to the manipulative procedure described in Example 1, part (c), is converted to 3-aminopyridazine.

I claim:
1. A member of the group consisting of 3-amino-6-halopyridazines and acid-addition salts thereof, said pyridazines having the formula

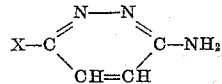

wherein X is selected from the class consisting of chlorine and bromine.

2. 3-amino-6-chloropyridazine.
3. 3-amino-6-bromopyridazine.
4. In the process for the preparation of 3-aminopyridazine, the steps which comprise heating a 3,6-dihalopyridazine, wherein the halogen atom is selected from the class consisting of chlorine and bromine, with ammonia in ethanol at a temperature between about 100° and 150° C., and isolating the resulting 3-amino-6-halopyridazine.
5. In the process for the preparation of 3-aminopyridazine, the steps which comprise heating 3,6-dichloropyridazine with ammonia in ethanol at a temperature between about 100° and 150° C., and isolating the resulting 3-amino-6-chloropyridazine.

References Cited in the file of this patent
UNITED STATES PATENTS 2,671,086   Rogers et al. _____ Mar. 2, 1954

OTHER REFERENCES

Anderson et al.: J. Amer. Chem. Soc., vol. 64, pp. 2902–2905 (1942).

Mizzoni et al.: J. Am. Chem. Soc., vol. 73, pp. 1873–1874 (1951).